Figure 1:
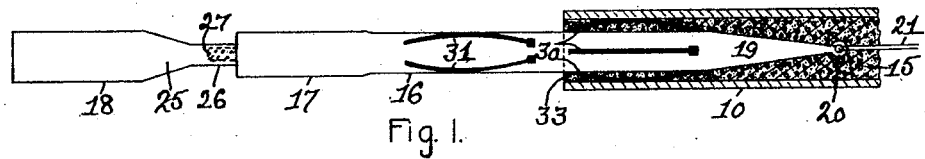

Aug. 4, 1925.

1,548,161

R. J. NEWSON

METHOD OF AND APPARATUS FOR MAKING CEMENT LINED PIPE

Filed Oct. 12, 1922

INVENTOR.
Reeves J. Newsom
by Jas. H. Churchill
Atty.

Patented Aug. 4, 1925.

1,548,161

UNITED STATES PATENT OFFICE.

REEVES J. NEWSOM, OF LYNN, MASSACHUSETTS.

METHOD OF AND APPARATUS FOR MAKING CEMENT-LINED PIPE.

Application filed October 12, 1922. Serial No. 594,052.

*To all whom it may concern:*

Be it known that I, REEVES J. NEWSOM, a citizen of the United States, residing in Lynn, in the county of Essex and State of Massachusetts, have invented an Improvement in Methods of and Apparatus for Making Cement-Lined Pipe, of which the following description in connection with the accompanying drawings is a specification, like characters on the drawings representing like parts.

This invention relates to a novel method of and apparatus for manufacturing a cement lined pipe or like hollow article, and particularly for manufacturing a superior cement lined pipe, as will be described.

To this end, the pipe to be lined, such as an iron pipe, is filled for a portion of its length with a mass of plastic cement, preferably of a composition as will be described, and said mass of cement is converted into tubular form by means of a mandrel and a follower, as will be described, which are drawn through the pipe. The mandrel and follower are centered within the pipe as will be described, so as to form a tubular lining of uniform or substantially uniform thickness throughout the length of the iron or other pipe.

The mandrel and follower are suitably shaped to enable the mandrel to first shape the plastic mass into the form of a tubular section of less internal diameter than that of the finished lining, and the follower is suitably shaped to subject the tubular section formed by the mandrel to internal pressure so as to compress the material of said tubular section and form a tube of larger internal diameter.

It is preferred to employ an additional follower of larger diameter, which is attached to the first follower so as to still further compress the tubular section compressed by the first follower, and to thereby enlarge the internal diameter of said tubular section, and said second follower is suitably constructed and arranged to permit the plastic material compressed by the first follower to be relieved from internal pressure and to expand inwardly before being compressed by the second follower.

Pipes may be lined with any desired cementitious material as above described, but it is preferred to use a special composition of cementitious materials to obtain a superior cement lined pipe. The composition preferred by me is a mixture of natural or Rosendale cement, Portland cement and a substance, such as hydrate of lime, which imparts elasticity to the mixture.

A pipe provided with a lining of the composition referred to and produced as above described, is superior to the ordinary cement lined pipe, in that the lining is stronger, of uniform thickness throughout its length, can be used in a materially shorter time and can be handled roughly without injuring the lining.

These and other features of this invention will be pointed out in the claims at the end of this specification.

Figure 2:
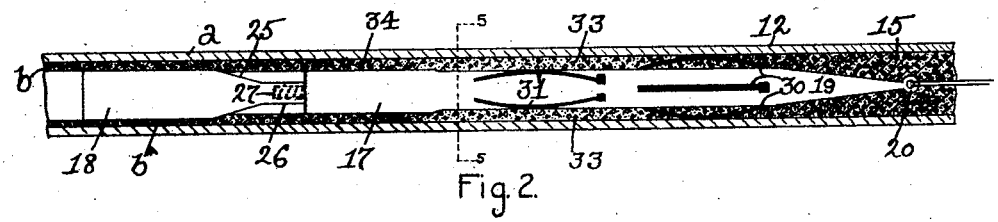
Figure 3:
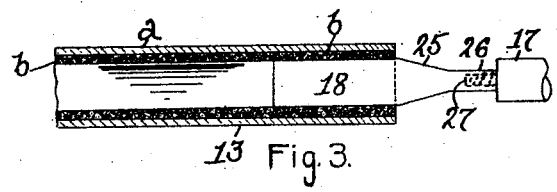

Figs. 1, 2 and 3 represent in section portions of an iron or other pipe and an apparatus to illustrate the improved method of manufacturing cement lined pipe.

Figure 4:
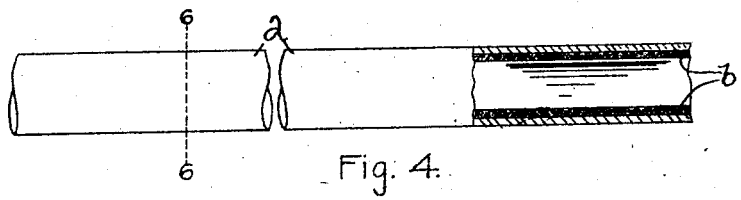

Fig. 4, a view in elevation and section of a portion of the finished pipe.

Figure 5:
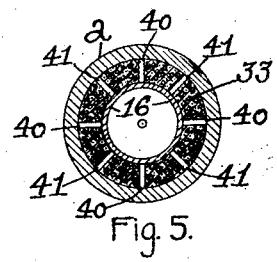

Fig. 5, a cross section on an enlarged scale taken on the line 5—5, Fig. 2, and

Figure 6:
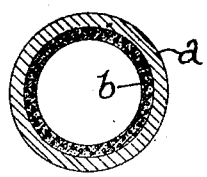

Fig. 6, a cross section of the finished pipe on an enlarged scale, taken on the line 6—6, Fig. 4.

Referring to Figs. 1, 2 and 3, $a$ represents a pipe to be lined, which may be of iron or steel or other metal, and of any desired size or diameter according to the use to which the lined pipe is to be put.

The three pieces or sections 10, 12, 13 of pipe shown in Figs. 1, 2 and 3 form part of a continuous length of pipe, the pieces 10, 13 being the end portions and the piece 12 the intermediate portion of said pipe.

The pipe $a$ is provided with a lining $b$ of cementitious material, which is preferably of a novel mixture or composition of cement, as will be described, with which a superior cement lined pipe is obtained.

The pipe $a$ is provided with the lining $b$ in the following manner: The pipe $a$ is filled for a portion of its length with a mass 15 of cement, which is present in sufficient quantity to ensure the lining $b$ being formed therefrom for the entire length of the metal pipe $a$. The partially filled pipe $a$ is then laid in a horizontal position upon a suitable support, not shown, and a device or apparatus for converting the mass of cement 15 into the tubular lining $b$ is drawn through the pipe.

The apparatus referred to may and preferably will be made as herein shown and comprises a member 16 constituting the initial forming member or mandrel and members 17, 18 constituting followers or finishing members.

The mandrel 16 is provided at its front end with a conical nose 19, provided with an eye 20 to which a wire, cord or other device 21 is attached for drawing the mandrel through the pipe $a$. The mandrel 16 has attached to its rear end the followers 17, 18.

In the present instance, the follower 17 is shown integral with the mandrel and the follower 18 detachably secured to the follower 17. The follower 17 is of larger diameter than the mandrel and the follower 18 is of larger diameter than the follower 17. The follower 18 is provided with a front portion 25 of smaller diameter than the follower 17 for a purpose, as will be described. The front portion 25, as shown, is made conical and is provided with a cylindrical extension 26 which has a screw threaded socket for the reception of a screw threaded projection 27 on the follower 17, as indicated by dotted lines in Figs. 1, 2 and 3.

The mandrel 16 is provided with yielding devices for centering the mandrel in the pipe $a$, and it is preferred to employ two sets 30, 31 of said centering devices, which are designed to contact with the interior of the pipe $a$, preferably on opposite sides of the center of gravity of the mandrel and its attached followers.

The centering devices are preferably made as narrow wings or spring metal strips which are rigidly secured at their front ends to the mandrel and are free at their rear ends. The metal strips are bowed outwardly to engage the inner circumference of the pipe $a$ and have their free ends in sliding engagement with the mandrel. The metal strips 30, 31 are arranged about the circumference of the mandrel and extend lengthwise thereof, and may be arranged on the quarter, with the strips of the set 31 arranged out of line with the strips of the set 30 and preferably midway between the latter strips. By locating the centering devices on opposite sides of the center of gravity of the tube-forming apparatus, the latter is accurately centered for its entire length with relation to pipe $a$ and its rear end is prevented from dropping under the influence of gravity. As a result of this arrangement, a cement lining of uniform thickness is formed throughout the length of the pipe.

In operation, the conical nose 19 of the mandrel is entered into the plastic mass 15 of cement, which fills the rear end of the pipe as indicated in Fig. 1 and the mandrel and followers are drawn through the pipe by means of the wire or cord 21.

As the mandrel is drawn into the pipe $a$, it is centered therein by the front set 30 of the spring strips or flexible wings, and a portion of the mass 15 of cement is converted into the form of a tubular section 33 of greater thickness and less internal diameter than that desired for the finished lining $b$.

As the mandrel progresses through the pipe $a$, the second set 31 of wings or centering strips is brought within the pipe $a$, and both sets of centering devices engage the interior surface of the pipe $a$ and being free at their rear ends readily yield to irregularities in said surface.

As the mandrel progresses through the pipe $a$, the mass 15 of cement between the mandrel and the pipe forms the tubular section 33 which is reduced slightly by the follower 17, to form a section 34 of less thickness and greater internal diameter than the section 33, see Fig. 2, and the section 34 is still further reduced in thickness and made of greater internal diameter by the follower 18 to form the lining $b$.

As the mandrel passes through the pipe $a$, the centering wings 30, 31 form relatively narrow slots 40, 41 respectively in the tubular section 33 of cement, and these slots are filled up or closed with cement by the followers 17, 18, so that the finished lining $b$ is free from said slots, as shown in Figs. 4 and 6.

After the follower 17 has compressed the plastic material and formed the section 34 of the tubular lining, the latter is relieved from pressure by the smaller front portion 25, 26 of the follower 18, which allows the plastic section 34 to expand somewhat and air bubbles therein to escape, after which it is still further compressed and compacted by the follower 18, thereby forming the lining $b$ which is compact and provided with a smooth interior and is of substantially uniform thickness throughout the length of the pipe.

The cement used may be such as is now commonly used for forming the lining of iron pipes, to wit, natural or Rosendale cement, but it is preferred to use a cementitious mixture or composition composed of Rosendale or like natural cement, Portland cement and hydrated lime; as with such mixture or composition, a superior lining is obtained, in that said mixture is quicker setting, more elastic or workable, and harder when set than that heretofore used and known to me.

Pipes provided with a lining of the preferred composition can be made and used in about three or four days, whereas pipes lined with natural cement, to wit, Rosendale, require aging for two or three weeks, and then have to be handled with care to avoid fracturing the lining, where as a pipe lined with the preferred composition can be roughly handled without injuring the lining three or four days after it has been made.

A cement lined pipe of the composition described and produced by the method and with the apparatus herein described is especially useful as a water pipe and is superior to cement lined pipes heretofore produced and known to me, in that the cement lining is of uniform or substantially uniform thickness throughout the length of the pipe and is less expensive to produce, as the centering yielding wings enable the mandrel to be used in pipes whose inner surfaces do not have to be previously treated by plugging or drifting, as now commonly practiced, and further as the lined pipes can be commercially used three or four days after they have been formed.

It is preferred to use a cement composed of about 25% natural cement, 70% Portland cement and 5% hydrated lime, but it is not desired to limit the invention in this respect, as good results can be obtained with compositions ranging from 5 to 40% natural cement, 60 to 90% Portland cement and 2 to 15% hydrated lime, depending upon the service the pipe is to be used for, the character of the water and the temperature.

An iron pipe lined with cement of the preferred composition can be used in place of brass or lead pipe.

While it is preferred to locate the sets of wings on opposite sides of the center of gravity of the mandrel and its attached follower or followers, it is not desired to limit the invention in this respect, as good results may be obtained with both sets of wings on the same side of the center of gravity but with one set as 31 at or near the center of gravity.

Claims—

1. The method of making cement lined pipe, which consists in shaping a plastic mass of cement within a pipe into the form of a cylindrical tube which is of less internal diameter than that of the finished lining, subjecting the cylindrical cement tube thus formed to internal pressure to compress the material thereof and form a cylindrical tube of larger internal diameter, withdrawing the internal pressure from the tube of larger internal diameter to permit its material to expand inwardly, and then subjecting the tube to internal pressure to compress the material thereof and again enlarge the internal diameter thereof.

2. Apparatus for forming a tubular cement lining within a pipe from a mass of plastic cement within said pipe, comprising a mandrel of smaller diameter than that of the lining desired, a follower of larger diameter than said mandrel and connected with the rear end thereof, and yielding centering devices attached to said mandrel and located on opposite sides of the center of gravity of said mandrel and a follower.

3. Apparatus for forming a tubular cement lining within a pipe from a mass of plastic cement within said pipe, comprising a mandrel having at its front end a conical nose, and at its rear end a follower of larger diameter than said mandrel, said mandrel having attached to it between its ends yielding centering wings.

4. Apparatus for forming a tubular cement lining within a pipe from a mass of plastic cement within said pipe, comprising a mandrel provided with centering devices located between its ends, and a plurality of followers of larger diameter than said mandrel and connected therewith, one of said followers having a reduced portion which is attached to the other of said followers.

In testimony whereof, I have signed my name to this specification.

REEVES J. NEWSOM.